Oct. 8, 1957 A. B. McEACHERN 2,809,057
FLEXIBLE JOINT FOR ANNULAR MEMBERS AND EMPLOYING
WEDGE SHAPED CONNECTING UNITS
Filed Feb. 18, 1955 2 Sheets-Sheet 1

INVENTOR
A. B. McEACHERN
BY
Maybee & Legris
ATTORNEYS

Oct. 8, 1957  A. B. McEACHERN  2,809,057
FLEXIBLE JOINT FOR ANNULAR MEMBERS AND EMPLOYING
WEDGE SHAPED CONNECTING UNITS
Filed Feb. 18, 1955  2 Sheets-Sheet 2

INVENTOR
A. B. McEACHERN
BY
Maybee & Legris
ATTORNEYS

United States Patent Office 2,809,057
Patented Oct. 8, 1957

2,809,057

FLEXIBLE JOINT FOR ANNULAR MEMBERS AND EMPLOYING WEDGE SHAPED CONNECTING UNITS

Alexander Benjamin McEachern, Rexdale, Ontario, Canada, assignor to Orenda Engines Limited, Malton, Peel, Ontario, Canada, a corporation Application February 18, 1955, Serial No. 489,188

16 Claims. (Cl. 285—187)

This invention relates to a flexible joint for annular members, and is particularly adapted for use in coupling a jet pipe to the tail cone of a gas turbine engine.

In some cases it is desired, when joining the ends of two annular members, to provide a joint which will transmit an axial load but which will allow a certain amount of bending at the joint. This is desired in the connection between the tail cone and jet pipe of a gas turbine engine. Various types of gimbal ring connections have been used, but since these connections usually depend on four pivots set in a circle 90° apart, they are heavy and limited in their ability to support an axial load.

It is an object of the present invention to provide a joint which will transmit a heavy axial load but permit relative rocking movement of the joined annular members.

It is another object to provide a joint that will distribute the axial load around the circumference of the annular members without transmitting a bending moment.

It is a further object to provide a joint which can be disengaged simply and quickly.

It is still another object to provide a joint which will absorb thermal expansion or contraction and which will accommodate a certain amount of misalignment in the annular members that it connects.

The invention is defined in the appended claims when read in the light of the following description of two embodiments. The two embodiments are illustrated in the accompanying drawings in which like reference numerals denote like parts in the various views and in which:

Fig. 1 shows generally a gas turbine engine having a tail cone 10 and a jet pipe 11 connected in accordance with this invention by means of a joint shown generally at 12. The details of the joint are shown in the other views.

Figure 4:
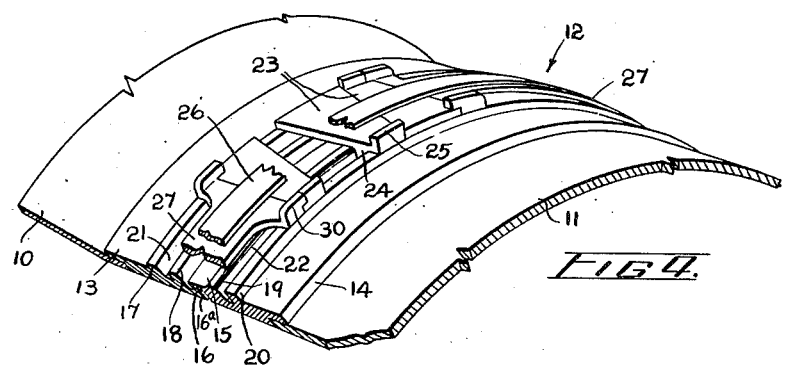
Fig. 4 is an enlarged fragmentary perspective view showing the construction of the joint.
Figure 7:
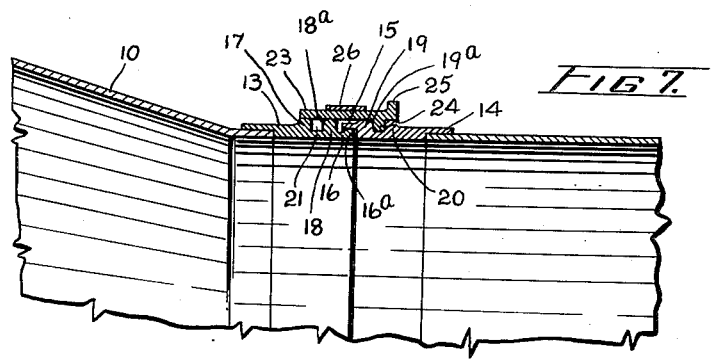
Fig. 7 is a sectional view along line 7—7 of Fig. 6.

The joined ends of the tail cone and jet pipe are provided with annular collars 13 and 14 respectively (Figs. 4 and 7). Collar 14 has a forwardly extending annular flange 15 which extends over the outer surface 16a of a rearwardly extending annular flange 16 on collar 13, forming a spigot connection between the tail cone and jet pipe. The surface 16a is curved to permit relative rocking movement or flexing between the tail cone and jet pipe about axes normal to the longitudinal axis of the engine.

The outer surfaces of the two annular collars 13 and 14 carry ribs 17, 18 and 19, 20, respectively, each pair of ribs defining a groove. These grooves are shown as 21 and 22. The groove surfaces 18a and 19a of the ribs 18 and 19 are curved (see Fig. 7) in a similar way to the surface 16a. A plurality of wedge shaped units 23 having inwardly extending lugs 24 and outwardly extending lugs 25 at their narrow ends span the spigot connection, with the lugs 24 forming tongue-in-groove connections with the grooves 21 and 22. Adjacent wedge units are oppositely directed (their edges converting in opposite directions) so that the lugs 24 of the adjacent wedge units engage different ones of the connected annular members 10 and 11. The wide ends of the wedge units merely rest slidably upon the ribs 17, 18, 19, 20. The tongue-in-groove connections prevent movement of each wedge unit in an axial direction of the annular member to which it is connected, but permit circumferential movement of the wedge units, and also, due to the curved surfaces 18a and 19a, and the complementarily curved surfaces of the lugs 24, permit rocking movement of the wedge units relative to the annular members about axes substantially tangential to the annular members when the annular members rock relative to each other.

Figure 1:
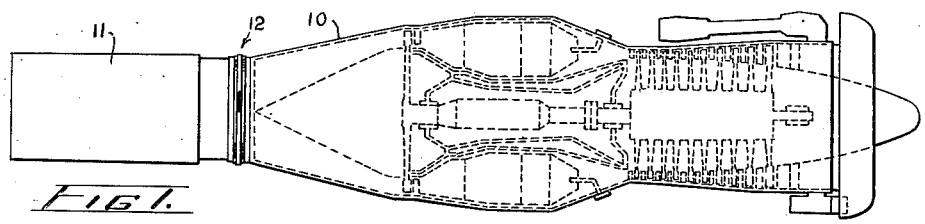
Fig. 1 is a side view of a gas turbine engine having a jet pipe and tail cone joined in accordance with the invention.
Figure 2:
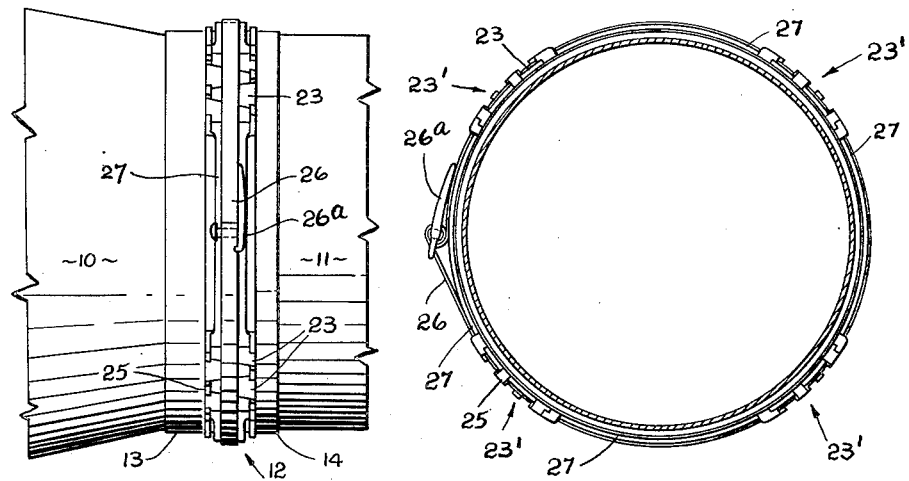
Fig. 2 is an enlarged view of the joined portions of the jet pipe and tail cone.
Figure 3:
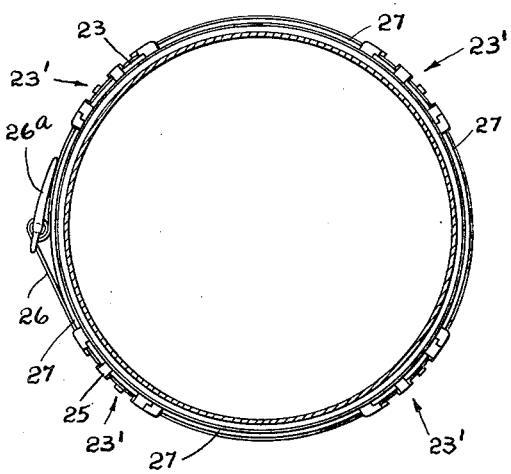
Fig. 3 is a view taken from one end of Fig. 2.
Figure 6:
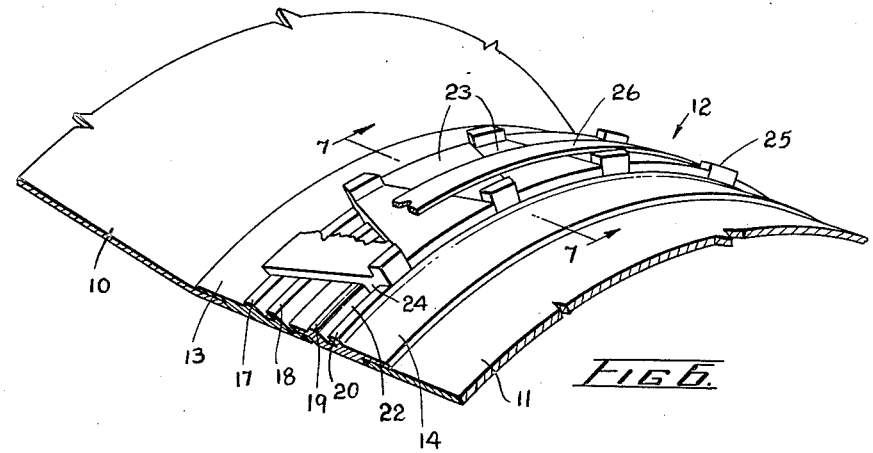
Fig. 6 is a perspective view similar to Fig. 4 of another embodiment of the invention.
Figure 8:
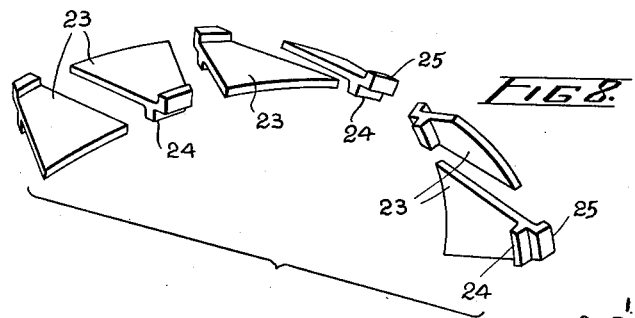
Fig. 8 is an exploded perspective view of units of the joint of Figs. 6 and 7.

In the embodiment shown in Figs. 6, 7 and 8 the wedge units 23 extend in edge to edge relationship, side by side, completely around the engine and are secured in place by a circumferential strap 26 having a quickly engageable and disengageable tightening clamp 26a such as that seen in Figs. 2 and 3. The lugs 25 prevent the strap from slipping axially of the engine off the units 23.

Figure 5:
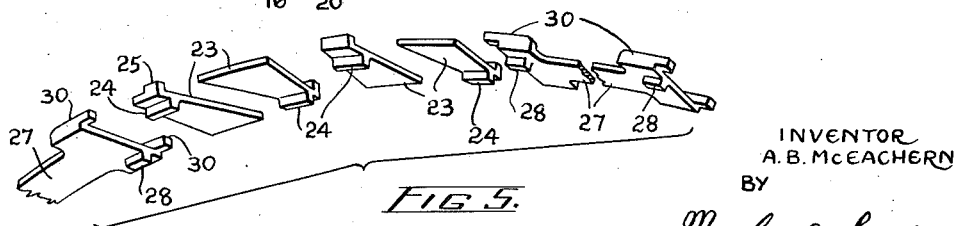
Fig. 5 is an exploded perspective view of units of the joint.

In the construction shown in Figs. 2 to 5, instead of a series of wedge units extending completely around the engine the wedge units are arranged in four groups or sets 23' of four units each, the sets being spaced apart equal distances by intermediate spacer units 27 curved longitudinally to conform to the curvature of the tail cone and jet pipe. The ends of the spacer units are enlarged, each end having an inwardly extending lug 28 engaging one of the grooves 21, 22, the lugs 28 at opposite ends of a given spacer engaging the same groove. The enlarged ends also have outwardly extending lugs 30 which project beyond the ends of the spacer units 27, as best seen in Fig. 5. The end edges of the units 27 are parallel to the engine axis and abut against similar side edges of adjacent wedge units, and the lugs 30 extend over the adjacent wedge units, helping to hold the wedge units in place. A circumferential strap 26 and clamp 26a firmly secure the units 23, 27 in position.

The series of units 23 in the embodiment of Figs. 6-8, and similarly the series of units 23, 27 in the embodiment of Figs. 2–5, constitutes a band extending completely around the annular members 10, 11. A non-axial load, which would impose a bending action upon a rigid joint, causes rocking of the members 10, 11 on the rounded spigot surface 16a, the wedge units 23 at one side of the engine and engaging groove 21 being drawn between the adjacent wedge units engaging groove 22, so that these wedge units shift circumferentially in their grooves 21, 22, tending to enlarge the diameter of the band, whereas the wedge units at the opposite side of the engine tend to withdraw from engagement with one another, permitting the aforementioned circumferential shifting and tending to reduce the diameter of the band, with the result that all the units remain in edge to edge contact, the diameter of the band remains substantially unaltered, and bending moment is not transmitted across the joint.

To further analyze the action during bending, consider a given wedge shaped unit 23 and two wedge shaped units on either side of it. The given unit engages, say, the groove 22 and, restrained by its tongue-in-groove connection, it is therefore immovable in an axial direction with respect to the annular member 11, although it is movable with the member 11 in an axial direction with respect to the other annular member 10. The units on either side of the given unit engage the groove 21 and, restrained by their tongue-in-groove connections, are therefore similarly immovable in an axial direction with respect to the annular member 10 but movable in an axial direction with respect to the member 11. Relative rocking of the members 10, 11 may tend to withdraw the given unit from between the units on either side, but at the same time another wedge shaped unit, at the other side of the engine, is moving farther between adjacent units, causing a circumferential shift which presses the contacting edges of all the units together in constant slidable contact.

During relative rocking of the members 10, 11 the units 23, 27 are free to rock on the surfaces 18a, 19a so that the strap 26 secures each unit constantly in contact with both members 10, 11. Thus the band which the units form assists in sealing the joint, and, with the spigot connection between the members, impedes fluid flow from the interior of the annular members.

Any axial component of load is taken up by the wedging action of the units 23, and in the embodiment of Figs. 6-8 is equally distributed around the circumference of the joint. The embodiment of Figs. 2-5 is suitable for lower axial loads. The spacer units 27 may provide a certain amount of circumferential pre-load.

In the embodiment of Figs. 2-5 four sets 23' of units 23 are shown spaced 90° apart. Alternatively three sets might be used, spaced 120° apart. In both embodiments, instead of lugs 24 being provided on the wedge shaped units 23 to engage grooves in the members 10, 11, equivalent restraining means may be provided by annular ribs on the members 10, 11 engaging recesses in the units 23, the grooves or recesses constituting guide means for circumferential movement of the units. The embodiments described herein are merely illustrative of the invention and many modifications are possible without departing from the spirit of the invention or the scope of the following claims.

What I claim as my invention is:

1. A joint connecting ends of a pair of substantially coaxial annular members so that the members may rock relative to each other about an axis normal to their own axes, comprising a set of at least three units one of which is located between the other two, restraining means holding the one unit immovable in an axial direction with respect to one of the annular members but movable with the one annular member in an axial direction with respect to the other annular member during relative rocking of the members, and restraining means holding the other two units immovable in an axial direction with respect to said other annular member but movable with said other annular member in an axial direction with respect to said one annular member during said rocking, the one unit having opposite edges in slidable contact with edges of the other two units, said opposite edges converging so that the one unit is wedge shaped, the restraining means including guide means wherein at least two of the units are slidable circumferentially of the annular members, pressing means constantly holding the edges of the units together in their slidable edge to edge contact, and securing means holding each unit against the annular member with respect to which it is axially immovable.

2. A joint as claimed in claim 1, in which the three units and the pressing means comprise a series of units with edges in slidable contact and forming a continuous band of substantially constant diameter extending completely around the circumference of the annular members, the pressing means comprising at least one wedge shaped unit spaced circumferentially from said one wedge shaped unit, and the securing means holding said band against the annular members.

3. A joint as claimed in claim 1, in which the pressing means comprises at least one more set of at least three units similar to but circumferentially spaced from the first mentioned set, and intermediate means located between and spacing apart the first mentioned set and the second mentioned set, the securing means holding both sets and the intermediate means against the annular members.

4. A joint as claimed in claim 1, in which the restraining means holding each circumferentially slidable unit comprises a tongue-in-groove connection of the unit with an annular member permitting the circumferential sliding and causing the axial immobility with respect to said member.

5. A joint as claimed in claim 2, in which the units are rockable on the annular members with respect to which they are immovable in an axial direction, the units being rockable about axes substantially tangential to the annular members.

6. A joint as claimed in claim 2, in which the securing means comprises a circumferential strap.

7. A joint as claimed in claim 3, in which the first mentioned set, the second mentioned set, and the intermediate means comprise a series of units with their edges in slidable contact, the series of units extending completely around the circumference of the annular members.

8. A joint as claimed in claim 3, in which the intermediate means comprise spacers slidable circumferentially of the annular members.

9. A joint as claimed in claim 6, in which the units have radially outwardly extending lugs which prevent the strap from slipping axially off the units.

10. A joint as claimed in claim 7, in which all the units are wedge shaped, the edges of each unit converging in the opposite direction to the edges of the units next to it.

11. A joint as claimed in claim 7, in which the intermediate means comprise spacers, the slidably contacting edges of each spacer being at ends of the spacer, said ends being parallel.

12. A joint as claimed in claim 11, in which the spacers have at said ends lugs which extend over the adjacent units which said ends contact.

13. A joint connecting ends of a pair of substantially coaxial members comprising a series of units extending around the ends of the members and forming a continuous band, opposite edges of each unit slidably contacting edges of adjacent units, a plurality of the units having tongue-in-groove connections with the annular members, the connections of adjacent units being to different ones of the annular members, the tongue-in-groove connection of each unit and annular member permitting sliding of the unit circumferentially of the annular member but preventing sliding of the unit axially of the annular member, the unit being slidable over the other member both circumferentially and axially thereof, the opposite edges of a plurality of the units converging so that the units are wedge shaped for transmitting axial loads to which the annular members are subjected, and securing means holding the units in their tongue-in-groove relationships to the annular members.

14. A joint as claimed in claim 13, in which the tongue-in-groove connection of each unit and annular member includes a curved surface permitting rocking of the unit relative to the annular member about an axis substantially tangential to the annular member.

15. A joint as claimed in claim 14, in which the end of one of the annular members fits snugly within the end of the other annular member, said ends having contacting surfaces forming a spigot connection, at least one of the contacting surfaces being curved to permit relative rocking of the annular members.

16. A joint as claimed in claim 15, in which the securing means comprises a circumferential strap holding the band in intimate contact with the annular members around the spigot connection to restrain fluid flow from the interior of the annular members.

References Cited in the file of this patent

UNITED STATES PATENTS

| | | |
|---|---|---|
| 2,439,161 | DuBois | Apr. 6, 1948 |
| 2,466,602 | Lombard | Apr. 5, 1949 |